UNITED STATES PATENT OFFICE.

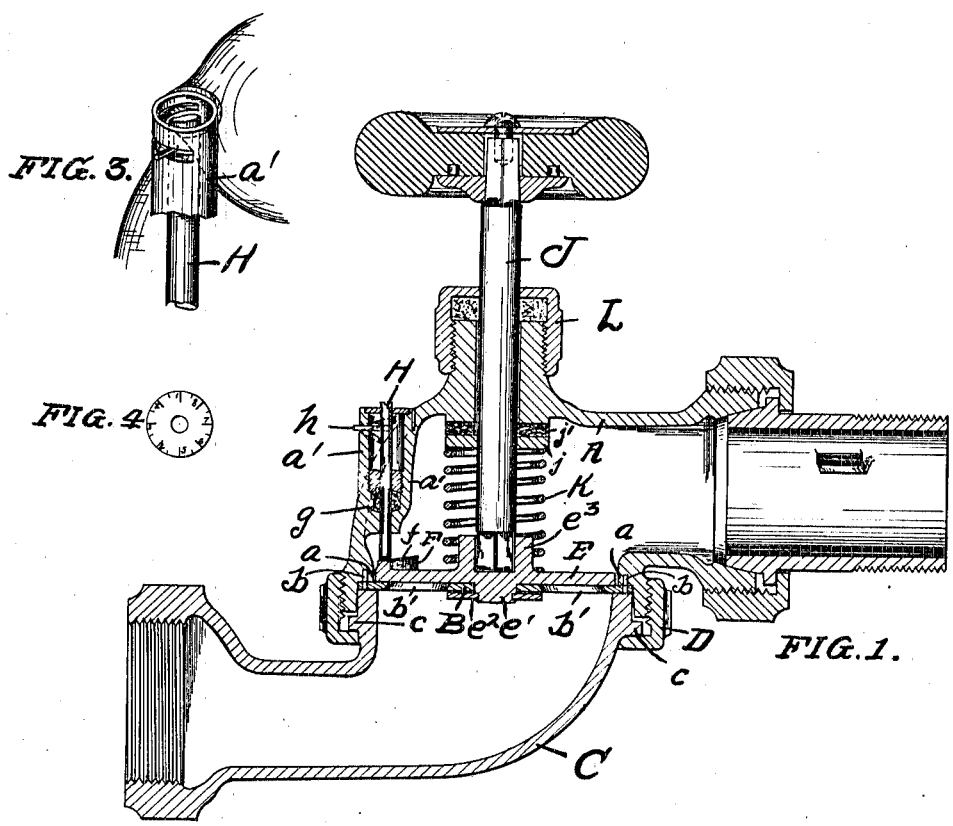

OLIVER SCHLEMMER, OF CINCINNATI, OHIO.

VALVE.

1,106,002.   Specification of Letters Patent.   Patented Aug. 4, 1914.

Application filed December 7, 1908. Serial No. 466,375.

*To all whom it may concern:*

Be it known that I, OLIVER SCHLEMMER, a citizen of the United States, residing at Cincinnati, in the county of Hamilton and State of Ohio, have invented certain new and useful Improvements in Valves, of which the following is a specification.

The object of my invention is to provide a valve of improved construction and operation and my invention consists in the combination and arrangement of parts hereinafter described and claimed.

In the drawings, Figure 1, is a sectional elevation of a valve embodying certain features of my invention; Fig. 2, a perspective view of the valve disk; Fig. 3, a perspective view of the stop for regulating the opening movement of the valve, and Fig. 4 a top plan view of the stop.

In the construction shown in the drawing there is a valve casing A recessed in its lower portion to receive the valve seat B and the upper end of the union elbow C. The valve seat slips loosely into its recess resting against shoulders $a$, on which it is positioned by pins $b$, and against which it is held by the upper end of union elbow C. A flange $c$ is provided on elbow C which is engaged by the threaded coupling D whereby the elbow may be adjustably held in position and the valve seat also secured in its position. The union elbow C is swiveled coaxially with the valve seat and its valve so that when adjusted or turned it will always afford a uniform delivery to the valve. By this construction it will be seen that the elbow may be set to any angle to receive a connecting pipe without affecting the action of the valve, and the valve seat may be readily removed or replaced when desired. The valve seat B is provided with openings or ports $b'$ and a valve disk E having corresponding ports $e$ is rotatably mounted thereon by means of a plug $e'$ extending through the center of the valve seat. A washer $e^2$ serves to secure the valve disk to the valve seat. On top of the valve disk, on one side, is provided a projection F having an inclined curved upper surface $f$ and at the other side of the disk there is provided a permanent stop $f'$ adapted to coöperate with a projection from the wall of the casing to limit the rotation of the valve at closing position. At one side, casing A is provided with a boss $a'$ adapted to receive threaded packing plug G through which passes a rod H carrying a pin $h$ projecting through a screw slot in the boss $a'$. The rod H projects into the valve casing to contact with surface $f$ of projection F on the valve disk, suitable packing $g$ being provided to prevent leakage. It will be observed that by turning rod H, the pin $h$ traveling in the screw slot will cause the rod to rise or fall causing its lower end to strike surface $f$ at different points when the valve disk is rotated and thus regulate the extent of rotation of the valve disk, and the extent to which the valve ports are opened. On the upper side of the valve disk is provided a hub $e^3$ having a square or rectilinear socket $e^4$ in which the similarly shaped lower end of the valve stem J is loosely inserted. The valve stem J carries a flange or shoulder $j$ which imprisons a packing disk $j'$ against the casing A and around the valve stem. A spring K is imprisoned between the flange $j$ and the valve disk E and serves to hold the valve disk to its seat and flange $j$ against packing $j'$. A suitable packing L is provided around valve stem J on the outside of the casing. By this arrangement it will be seen that the valve disk will be held to its seat and the interior packing compressed around the valve stem to prevent leakage around the valve stem in either direction or permit repacking of the outside packing L at any time.

While I have illustrated and described the preferred form of construction for carrying my invention into effect, this is capable of modification without departing from the spirit of the invention. I therefore do not wish to be limited to the exact construction set forth, but

What I claim as new and desire to secure by Letters Patent is:

In a device of the class described, the combination of a valve casing; a valve seat in the casing having a port; a rotatable valve having a port adapted to register with the seat port; a permanent stop adapted to limit the movement of the valve at closing position; an inclined curved surface carried by the valve; a rod H adapted to contact with said inclined curved surface, and a pin $h$ on the rod taking into a screw slot, substantially as specified.

OLIVER SCHLEMMER.

Witnesses:
ARTHUR E. GEORGE,
BRAYTON G. RICHARDS.